United States Patent Office 3,560,626
Patented Feb. 2, 1971

3,560,626
PROCESS FOR CONTROLLING NEMATODES WITH FLUORINATED ALCOHOLS
Robert E. A. Dear, Parsippany, and Everett E. Gilbert, Morristown, N.J., assignors to Allied Chemical Corporation, New York, N.Y.
No Drawing. Original application May 16, 1966, Ser. No. 550,113. Divided and this application Oct. 4, 1968, Ser. No. 786,518
Int. Cl. A01n 9/24
U.S. Cl. 424—343
8 Claims

ABSTRACT OF THE DISCLOSURE

Use in controlling nematodes of fluorinated alcohols of the formula

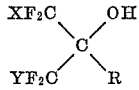

wherein X and Y may be selected from the group consisting of hydrogen, fluorine or chlorine and R is a lower alkyl, alkenyl, alkynyl or chlorine-substituted alkynyl group.

---

This is a division of application Ser. No. 550,113 filed May 16, 1966 and now abandoned. The invention relates to a process for controlling nematodes, and more particularly to a process for treating soil infested with nematodes.

Many different kinds of plants are known to be attacked by nematodes which are tiny-worm-like organisms which live in the soil and feed on the roots of plants, both in the field and in greenhouses. Plants infested by nematodes will present a weakened, sickly appearance without visible injury to the stem or to any part of the plant above ground. An examination of the roots will show numerous types of injury including knots or galls characterized by a swollen appearance. In cases of severe infestation, these injuries not only reduce the size and effectiveness of the root system, but also seriously affect other plant parts.

We have now discovered, that control of nematodes can be effected by treating the nematodes or nematode-infested areas or soils with a toxic quantity of a fluorinated alcohol having the structural formula

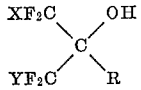

wherein X and Y are the same or different members selected from hydrogen, fluorine and chlorine; R is a member selected from lower (i.e. 1–8 carbon atoms) alkyl, alkenyl and alkynyl and chlorine-substituted alkynyl groups.

Illustrative of the compounds which can be used for controlling nematodes according to our invention are the following:

(1) 1,1,1-trifluoro-2-(trifluoromethyl)-3-butyne-2-ol; wherein X and Y are fluorine and R is —C≡CH.
(2) 1,1,1-trifluoro-2-(chlorodifluoromethyl)-3-butyne-2-ol; wherein X is chlorine, Y is fluorine and R is —C≡CH.
(3) 1,1-difluoro-2-(difluoromethyl)-3-butyne-2-ol; wherein X and Y are hydrogen and R is —C≡H.
(4) 1,1,1-trifluoro-2-trifluoromethyl-3-butene-2-ol; wherein X and Y are fluorine and R is —CH=CH₂.
(5) 1,1-bis(trifluoromethyl)-n-propanol; wherein X and Y are fluorine and R is —CH₂—CH₃.
(6) 1,1-bis(chlorodifluoromethyl)-2-propyne-1-ol; wherein X and Y are chlorine and R is —C≡CH.
(7) 1,1,1-trifluoro-2-(trifluoromethyl)-4-chloro-3-butyne-2-ol; wherein X and Y are fluorine and R is —C≡CCl.
(8) 1,1,1-trifluoro-2-(difluoromethyl)-3-butyne-2-ol; wherein X is fluorine, Y is hydrogen and R is —C≡CH.
(9) 1,1-difluoro-2-(chlorodifluoromethyl)-3-butyne-2-ol; wherein X is hydrogen, Y is chlorine and R is —C≡CH.
(10) 1,1-bis(difluoromethyl)-3-chloro-2-propyne; wherein X and Y are hydrogen and R is —C≡CCl.

The fluoroalcohols wherein R is lower alkyl, alkenyl or alkynyl can be prepared by reacting the appropriate alkyl-, alkenyl- or alkynyl magnesium halide in a solvent such as tetrahydrofuran with a fluoroacetone, followed by acid hydrolysis, according to the equations shown below:

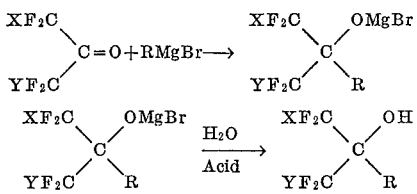

The fluoroalcohols wherein R is chlorine-substituted alkynyl can be prepared by reacting a fluoroacetone with a suspension of lithium chloroacetylide in a solvent such as diethyl ether, followed by acid hydrolysis (e.g. using ammonium chloride), according to the equations shown below:

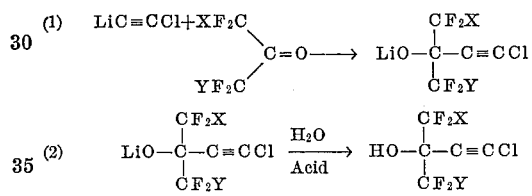

Control of nematodes by the fluoroalcohols of our invention can be effected by contacting the nematodes directly or by contacting the soil containing such nematodes with the fluoroalcohol alone or combined in compositions with other nematocidal adjuvants. When reference is made herein to contacting nematodes, it is to be understood that such contacting includes application to the nematodes per se, or to soil infected with nematodes. The nature of the compositions used will depend on circumstances and various factors such as mode of application, etc. The fluoroalcohol-containing compositions may be applied to the nematodes or to nematode-infested soil in any conventional manner as by spraying, drenching or dusting. The term "soil" as used herein is intended to include any medium capable of supporting the growth of plants. It is therefore intended to include, in addition to soil, humus, manure, compost, sand and artificial plant growth media including hydroponic media.

In a preferred embodiment of the invention, the fluoroalcohols are distributed in the soil by introduction in in water such as that employed to irrigate the soil. In this procedure the amount of water may be varried in accordance with the moisture content and the moisture equivalent of soil in order to obtain the desired depth of distribution of the toxic compound.

The fluoroalcohols described above may also be formulated as dust or granular compositions containing carriers or fillers such as talc, sand, fuller's earth, chalk, gypsum, etc., including active ingredients such as fertilizers, insecticides, herbicides and fungicides. The fluoroalcohols may be used for controlling nematodes without substantially affecting crops planted or growing in the soil.

The fluoroalcohols are effective as nematocides when distributed in the infested soil at a dosage of at least 50 pounds per acre and preferably between about 100 to 300 pounds per acre. In order to obtain complete eradication of the undesired nematodes, it is desirable that the soil be impregnated with the fluoroalcohol to a depth of at least about 6 inches, and preferably to provide at least about 1.0 pound of toxicant per 1,000 cubic feet of soil. It will be understood by those skilled in the art that minimal dosages are preferred when concerned with post-emergent treatments.

The following examples further illustrate the invention, but are not to be construed as limiting the same.

EXAMPLE 1

Preparation of 1,1,1-trifluoro-2-(trifluoromethyl)-3-butyne-2-ol

Ethynyl magnesium bromide was prepared from ethyl magnesium bromide, in turn prepared from ethyl bromide (60 grams, 0.55 mole) and magnesium (12 grams, 0.5 gram atom.) in dry tetrahydrofuran (THF) (300 ml) according to the instructions of Jones et al. (Org. Synth. 39, 56). The Grignard solution so obtained was cooled to −8° C. and hexafluoroacetone (66.2 grams, 0.4 mole) was passed in over a 2½ hour period. The mixture was stirred overnight at room temperature and then hydrolyzed with 10% aqueous HCl (200 ml). The excess solvent was distilled from the organic layer, leaving a THF: alcohol azeotrope, from which the free alcohol was obtained by distillation from concentrated $H_2SO_4$. That the desired compound was obtained was proved by boiling point 77° C. and infrared and N.M.R. spectra. Its structure is shown below:

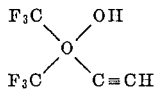

This compound, as well as being a good nematocide, exhibits excellent vapor phase bactericidal activity against *Staphylococcus aureus*.

EXAMPLE 2

Preparation of 1,1,1-trifluoro-2-(chlorodifluoromethyl)-3-butyne-2-ol

Following the procedure used in Example 1 above, 1 gram mole of ethynyl magnesium bromide was reacted with 0.9 gram mole of chloropentafluoroacetone in tetrahydrofuran solution. After recovery and distillation, 112.6 grams of product were recovered, corresponding to a yield of 59.8%. Its refractive index was $n_D^{25}$ 1.3530; its boiling point was 107°–107.5° C.

Analysis (percent by weight)—Calcd.: C, 28.80; H, 0.97. Found: C, 28.70; H, 1.11.

Its structure, confirmed by infrared spectrogram, is shown below:

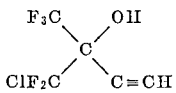

This compound is not only on effective nematocide but also exhibits good vapor phase bactericidal activity against *Staphylococcus aureus*.

EXAMPLE 3

Preparation of 1,1-difluoro-2-(difluoromethyl)-3-butyne-2-ol

Following the procedure used in Example 1 above, 1 gram mole of ethynyl magnesium bromide was reacted with 1.1 gram mole tetrafluoroacetone $(HF_2C)_2CO$ in tetrahydrofuran solution. After recovery and distillation, 78 grams of product were obtained corresponding to a yield of 67.8%. The purified product had a boiling point of 123° C., refractive index $n_D^{25}$ 1.3634.

Analysis (percent by weight)—Calcd.: C, 38.47; H, 2.58. Found: C, 38.45; H, 2.61.

Its structure, confirmed by infrared spectrogram, is

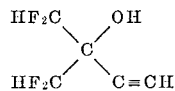

EXAMPLE 4

Preparation of 1,1,1-trifluoro-2-trifluoromethyl-3-butene-2-ol

Following the procedure used in Example 1 above, 62.5 grams (0.72 mole) of vinyl magnesium chloride was reacted with 116 grams (0.7 mole) of hexafluoroacetone in 250 ml. of dry tetrahydrofuran solution. After recovery and distillation, 55.5 grams of product was obtained corresponding to a yield of 40.8%. The purified product had a boiling point of 73.5° C., refractive index $n_D^{25}$ 1.3108.

Analysis (percent by weight)— Calcd.: C, 30.94; H, 2.08. Found: C, 30.67; H, 2.09.

Its structure is

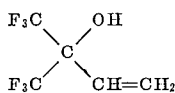

This compound, as well as being a good nematocide, exhibits excellent vapor phase bactericidal activity against *Staphylococcus aureus*.

EXAMPLE 5

Preparation of 1,1-bis(trifluoromethyl)-n-propanol

Following the procedure used in Example 1 above, 1.1 gram mole of ethyl magnesium bromide was dissolved in 500 ml ether and 1 mole hexafluoroacetone was added and reacted as described. After recovery and distillation, 94 grams of product was obtained corresponding to a yield of 53.4%. The purified product boiled at 78° C., and had a refractive index $n_D^{25}$ 1.3088.

Its structure is

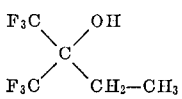

EXAMPLE 6

Preparation of 1,1-bis(chlorodifluoromethyl)-2-propyne-1-ol

Following the procedure used in Example 1 above, 1 gram mole of ethynyl magnesium bromide in 600 ml. tetrahydrofuran was reacted with 179 grams (0.9 mole) of dichlorotetrafluoroacetone $(F_2ClC)_2CO$. After recovery and distillation, 139 grams of product was obtained corresponding to a yield of 68.9%. The purified product had a boiling point of 138° C., refractive index $n_D^{25}$ 1.3939. Its structure is

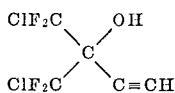

EXAMPLE 7

Preparation of 1,1,1-trifluoro-2-(trifluoromethyl)-4-chloro-3-butyne-2-ol

A 1.7 molar solution of methyl lithium in diethyl ether was added to 200 ml. anhydrous ether. The quantity of methyl lithium present was 22 grams (1.0 mole). Cis-dichloroethylene (48.5 grams, 0.5 mole) was added at 0–5° to this solution, with continuous cooling and stirring under a nitrogen atmosphere. The mixture containing lithium chloroacetylide (LiC≡CCl) so produced as allowed to warm to room temperature and stirred for 1½ hours to insure completion of the reaction. Hexafluoroacetone (83 grams, 0.5 mole) was passed into the mixture at ambient temperature, ca. 25° C., (with cooling to maintain the temperature over a 1½ hour period. After an additional hour's stirring, the pale brown mixture was cooled to —60° C. and the alcohol liberated by the addition of saturated ammonium chloride solution. The organic layer was recovered, washed with 2 N HCl, brine and dried over calcium sulfate. The excess ether was removed leaving an ether-alcohol azeotrope from which the free alcohol was recovered by passing the azeotrope through concentrated sulfuric acid at 85° C. and 50 mm. pressure. One hundred twelve grams crude 1,1,1-trifluoro-2-(trifluoromethyl)-4-chloro-3-butyne-2-ol was collected and was distilled to yield a water-white liquid B.P. 104° C., refractive index $n_D^{25}$ 1.3473. Its structure, confirmed by infrared spectrogram is shown below:

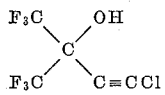

EXAMPLE 8

The compounds of Examples 1–7 were tested for effectiveness in fumigant control of nematodes (*Panagrellus redivivus*) by placing about 100 nematodes in a small petri dish containing 5 ml. of distilled water. The dish was placed open in a gallon Mason jar. About .06 ml. or .06 gram of the toxicant compound (equivalent to 1 lb. of test compound per 100 cubic feet of air) was placed in the jar on a cellucotton wad or in a small open container. When the nematode container and the test compound were in place, the jar was sealed. After 24 hours' exposure, the nematode container was removed, and a mortality count was made. Results of this test carried out on the compounds of Examples 1–7 are shown in Table I below.

TABLE I.—NEMATODE FUMIGANT TESTS

Compounds of Example:            Percent kill
1 ------------------------------------ 100
2 ------------------------------------ 100
3 ------------------------------------ 100
4 ------------------------------------ 100
5 ------------------------------------ 100
6 ------------------------------------ 100
7 ------------------------------------ 100

We claim:
1. The process for controlling nematodes which comprises contacting nematodes with a nematocidally effective amount of a fluoroalcohol of the general formula

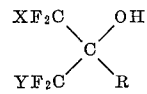

wherein X and Y may be the same or different and are selected from the group consisting of hydrogen, chlorine and fluorine; R is a lower alkyl, alkenyl, alkynyl or chlorine-substituted alkynyl radical of 1 to 8 carbon atoms.

2. The process of claim 1 wherein the fluoroalcohol is applied to nematode-infested soil.

3. The process of claim 1 wherein X and Y are fluorine and R is —C≡CCl.

4. The process of claim 1 wherein X is chlorine, Y is fluorine and R is —C≡CH.

5. The process of claim 1 wherein X and Y are hydrogen and R is —C≡CH.

6. The process of claim 1 wherein X and Y are fluorine and R is —CH=CH₂.

7. The process of claim 1 wherein X and Y are fluorine and R is —CH₂—CH₃.

8. The process of claim 1 wherein X and Y are chlorine and R is —C≡CH.

References Cited

UNITED STATES PATENTS 3,338,977    8/1967    Velhius ---------- 424—343X
3,362,985    1/1968    Gilbert et al. -------- 269—482

ALBERT T. MEYERS, Primary Examiner
D. R. ORE, Assistant Examiner

U.S. Cl. X.R.
424—357